(12) United States Patent
Lee

(10) Patent No.: US 9,735,897 B2
(45) Date of Patent: Aug. 15, 2017

(54) ELECTRONIC DEVICE AND METHOD FOR CONTROLLING RADIATION POWER

(71) Applicant: Samsung Electronics Co., Ltd., Suwon-si (KR)

(72) Inventor: Seok Woo Lee, Gumi-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/881,050

(22) Filed: Oct. 12, 2015

(65) Prior Publication Data
US 2016/0105854 A1 Apr. 14, 2016

(30) Foreign Application Priority Data
Oct. 13, 2014 (KR) .................. 10-2014-0137720

(51) Int. Cl.
H04B 7/00 (2006.01)
H04B 17/10 (2015.01)
H04W 52/36 (2009.01)
H04W 52/28 (2009.01)
H04B 1/3827 (2015.01)

(52) U.S. Cl.
CPC ........ *H04B 17/102* (2015.01); *H04W 52/367* (2013.01); *H04B 1/3838* (2013.01); *H04W 52/285* (2013.01); *H04W 52/288* (2013.01)

(58) Field of Classification Search
CPC .. H04B 1/3838; H04W 52/18; H04W 52/288; H04W 52/367

USPC ............................ 455/67.11, 126, 127.1, 522
See application file for complete search history.

(56) References Cited

U.S. PATENT DOCUMENTS

| | | | | |
|---|---|---|---|---|
| 2012/0214422 A1* | 8/2012 | Shi | ................. | H04B 1/3838 455/67.11 |
| 2012/0270519 A1* | 10/2012 | Ngai | ................. | H04W 52/226 455/404.1 |
| 2013/0169348 A1* | 7/2013 | Shi | ................. | H04B 1/3838 327/517 |
| 2014/0066124 A1* | 3/2014 | Novet | ................. | H04M 1/72569 455/556.1 |
| 2014/0256378 A1* | 9/2014 | Park | ................. | H04W 52/367 455/552.1 |
| 2014/0306553 A1 | 10/2014 | Lee | | |
| 2015/0234077 A1* | 8/2015 | Komulainen | ................. | G01V 3/12 324/629 |
| 2015/0341869 A1* | 11/2015 | Sen | ................. | H04W 52/34 455/522 |

FOREIGN PATENT DOCUMENTS

KR 20140124305 A 10/2014

* cited by examiner

*Primary Examiner* — Duc M Nguyen

(57) ABSTRACT

An electronic device includes: a sensor circuitry configured to generate information about a user's motion, at least one processor configured to determine a plurality of threshold values to be compared with a radiation power value and set the radiation power value associated with the determined plurality of threshold values, and an antenna configured to perform a communication in accordance with power.

15 Claims, 7 Drawing Sheets

ELECTRONIC DEVICE AND METHOD FOR CONTROLLING RADIATION POWER

CROSS-REFERENCE TO RELATED APPLICATION(S) AND CLAIM OF PRIORITY

The present application is related to and claims priority from and the benefit under 35 U.S.C. §119(a) of a Korean patent application filed on Oct. 13, 2014 in the Korean Intellectual Property Office and assigned Serial number 10-2014-0137720, the entire disclosure of which is hereby incorporated by reference.

TECHNICAL FIELD

The present disclosure relates generally to a radiation power control method of an antenna performed in an electronic device.

BACKGROUND

Electronic devices such as smartphones and tablet PCs may include antennas for performing wireless communication and data communication. The electronic devices may perform a set of communication functions by providing radiation power to antennas. The performance of an antenna such as a data transmission/reception speed may depend on the intensity of radiation power. The radiation power of an antenna may be determined within a specified range in consideration of specific absorption rate (SAR) (such as an amount of electromagnetic waves absorbed into the body) generated from the antenna. The electronic device may reduce the amount of electromagnetic waves absorbed into a user by lowering radiation power. Additionally, the electronic device may detect whether a user around approaches. Therefore the electronic device may reduce the generation of electromagnetic waves by lowering radiation power if the user is detected within a specified range.

The conventional techniques adjust radiation power on the basis of one threshold value applied to both the case that a user approaches an electronic device and the case that a user leaves an electronic device. For example, when a distance to a user is detected based on a change in a capacitance of a capacitor included in an electronic device, the conventional techniques reduce radiation power to a specified value when the capacitance is equal to or greater than a specified threshold value and raises the radiation power to a default setting value again when the capacitance is less than the specified threshold value.

However, in a proximity sensor system in which a change of capacitance is not constant when a user approaches and leaves to/from an electronic device, the conventional techniques may provide a low radiation power value that is not enough to efficiently perform transmissions and receptions even when a user is sufficiently away from the electronic device.

SUMMARY

To address the above-discussed deficiencies, it is a primary object to provide a radiation power control method and electronic device for detecting a user's operation on the basis of a plurality of threshold values and based on this setting the radiation power of an antenna.

In accordance with an embodiment, a method for controlling radiation power in an electronic device is provided. In this example, the method includes generating information about a user's motion through a sensor circuitry. The method further includes determining a plurality of threshold values to be compared with a radiation power value. The method further includes setting the radiation power value associated with the determined plurality of threshold values and performing a communication in accordance with power. The power is determined by the radiation power value. An apparatus for performing this method is also provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
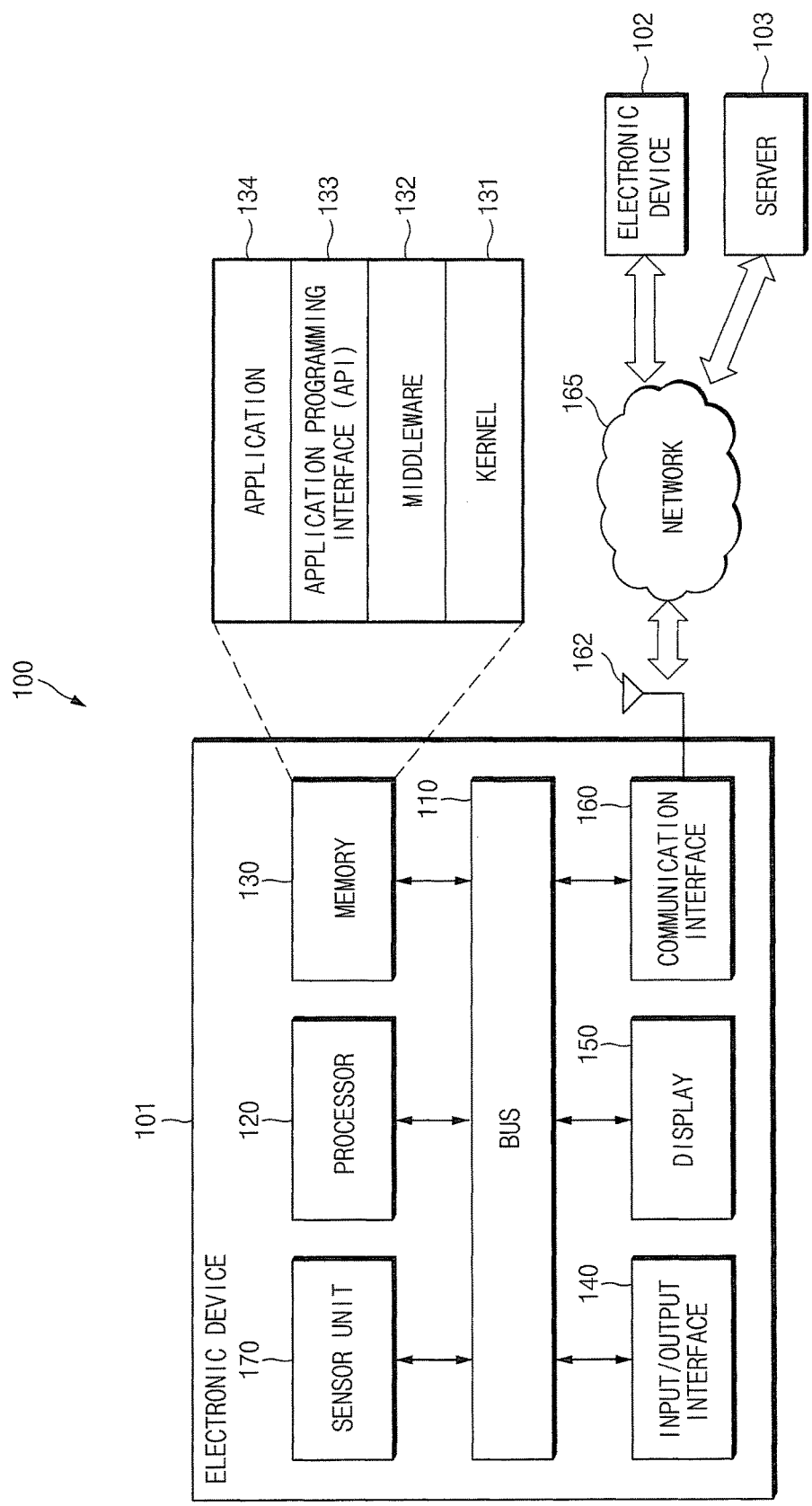
FIG. 1 illustrates an example network environment for an electronic device according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, an electronic device according to various embodiments of the present disclosure will be described in more detail with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

In various embodiments of the present disclosure, the expression "A or B" or "at least one of A or/and B" may include all possible combinations of items listed together. For instance, the expression "A or B", or "at least one of A or/and B" may indicate include A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure may be a device with a communication function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to some embodiments of the present disclosure, an electronic device may be smart home appliances having a communication function The smart home appliances may include at least one of, for example, televisions, digital video disk (DVD) players, audios, refrigerators, air conditioners, cleaners, ovens, microwave ovens, washing machines, air cleaners, set-top boxes, TV boxes (for example, SAMSUNG HOMESYNC™, APPLE TV™, GOOGLETV™, or the like), game consoles, electronic dictionaries, electronic keys, camcorders, and electronic picture frames.

According to some embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' point of sales (POS), each of which has a communication function.

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments), each of which has a communication function. An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, a radiation power control technique according to various embodiments of the present disclosure will be described in more detail with reference to the accompanying drawings. The term "user" in various embodiments may refer to a person using an electronic device or a device using an electronic device (for example, an artificial intelligent electronic device).

FIG. 1 illustrates an example network environment 100 for an electronic device 101 according to various embodiments of the present disclosure.

As illustrated in FIG. 1, the electronic device 101 includes a bus 110, a processor 120, a memory 130, an input/output interface 140, a display 150, a communication interface 160, an antenna 162, and a sensor unit (or sensor circuitry) 170. According to various embodiments of the present disclosure, the electronic device 101 controls the radiation power of the antenna 162 on the basis of information obtained by detecting a user through the sensor unit 170. The electronic device 101 controls radiation power by comparing the information with a plurality of threshold values.

The bus 110 is a circuit connecting the aforementioned components to each other and delivering a communication (such as a control message) between the above-mentioned components.

The processor 120 receives instructions from the aforementioned other components (such as the memory 130, the input/output interface 140, the display 150, the communication interface 160, and the sensor unit 170) through the bus 110, interprets the received instructions, and executes calculation or data processing according to the interpreted instructions.

The memory 130 stores instructions or data received from the processor 120 or the other components (such as the input/output interface 140, the display 150, the communication interface 160, the sensor unit 170, and so on) or generated by the processor 120 or the other components. The memory 130 includes programming modules such as a kernel 131, a middleware 132, an application programming interface (API) 133, or an application 134. Each of the aforementioned programming modules are configured with a software, a firmware, a hardware, or a combination of thereof.

According to various embodiments of the present disclosure, the memory 130 stores a plurality of threshold values serving as a reference of a radiation power setting, a reference distance to a user, or a radiation power value.

The kernel 131 controls or manages system resources (such as the bus 110, the processor 120, the memory 130, and so on) used for performing operations or functions implemented in the remaining other programming modules such as the middleware 132, the API 133, or the application 134. Additionally, the kernel 131 provides an interface for performing a controlling or managing operation by accessing an individual component of the electronic device 101 from the middleware 132, the API 133, or the application 134.

The middleware 132 serves as an intermediary role for exchanging data as the API 133 or the application 134 communicating with the kernel 131. Additionally, in relation to job requests received from the application 134, the middleware 132 performs a control (such as scheduling or load balancing) for the job requests by using a method of assigning a priority for using a system resource (such as the bus 110, the processor 120, the memory 130, and so on) of the electronic device 101 to at least one application among the applications 134.

The API 133 (such as an interface for allowing the application 134 to control a function provided from the kernel 131 or the middleware 132) includes at least one interface or function (such as an instruction) for a file controlling, a window controlling, an image processing, or a character controlling.

According to various embodiments of the present disclosure, the application 134 includes SMS/MMS applications, e-mail applications, calendar applications, notification applications, health care applications (such as applications for measuring exercise amount or blood glucose), or environmental information applications (such as applications for providing pressure, humidity, or temperature information).

Additionally or alternatively, the application 134 is an application relating to information exchange between the electronic device 101 and an external electronic device (such as the electronic device 102 or the server 103). The information exchange related application includes a notification relay application for relaying specific information to the external device or a device management application for managing the external electronic device.

The input/output interface 140 delivers an instruction or data inputted from a user through an input/output device (such as a sensor, a keyboard, or a touch screen) to the processor 120, the memory 130, the communication interface 160, or the sensor unit 170 through the bus 110. For example, the input/output interface 140 provides to the processor 120 data on a user's touch inputted through a touch screen. Additionally, the input/output interface 140 outputs, through the input/output device (such as a speaker or a display), instructions or data received from the processor 120, the memory 130, the communication interface 110, or the sensor unit 170 through the bus 110. For example, the input/output interface 140 outputs voice data processed through the processor 120 to a user through a speaker.

The display 150 displays various information (such as multimedia data or text data) to a user.

The communication interface 160 connects a communication between the electronic device 101 and an external device (such as the electronic device 102 or the server 103). For example, the communication interface 160 communicates with the external device in connection to the network 165 through wireless communication or wired communication. The wireless communication, for example, may include at least one of wireless a fidelity (WiFi), BLUETOOTH® (BT), a near field communication (NFC), a global positioning system (GPS), and a cellular communication (such as long-term evolution (LTE), LTE-Advanced (LTE-A), code division multiple access (CDMA), wideband CDMA (WCDMA), universal mobile telecommunication system (UMTS), wireless broadband (WiBro), or global system for mobile communications (GSM)). The wired communication, for example, can include at least one of an universal serial bus (USB), a high definition multimedia interface (HDMI), a recommended standard 232 (RS-232), and a plain old telephone service (POTS), for example.

According to various embodiments of the present disclosure, the communication interface 160 adjusts radiation power on the basis of information obtained by detecting a user through the sensor unit 170. The communication interface 160 compares detection information by the sensor unit 170 (such as information generated by a proximity sensor for detecting a distance to a user) with a plurality of threshold values (such as an entry threshold value or a withdrawal threshold value) and sets a radiation power value according to a comparison result. Unlike a typical technique for controlling radiation power on the basis of a single threshold value, the communication interface 160 performs a radiation power controlling by using a plurality of threshold values. Information on a configuration or an operation of the communication interface 160 is provided as shown in FIGS. 3 to 7.

According to various embodiments of the present disclosure, some functions of the communication interface 160 are performed by the processor 120. For example, the processor 120 receives information obtained by detecting a user through the sensor unit 170. The processor 120 determines a radiation power value by comparing the detection information with a plurality of threshold values. The processor 120 provides the determined radiation power value to the communication interface 160. The communication interface 160 provides power to the antenna 162 according to the radiation power value.

The antenna 162 is configured according to radiation power provided from the communication interface 160. The antenna 162 transmits/receives data to/from an external electronic device (such as the electronic device 102 or the server 103). In relation to the antenna 162, its communication quality is improved when radiation power provided through the communication interface 160 becomes higher and its communication quality is deteriorated when the radiation power becomes lower. The antenna 162 shown in FIG. 1 is displayed separated from the communication interface 160 but the present disclosure is not limited thereto. According to various embodiments of the present disclosure, the antenna 162 is implemented in a form of being included in the communication interface 160.

When the antenna 162 forms a communication channel with an external electronic device (such as the electronic device 102 or the server 103) and transmits/receives data, it generates electromagnetic waves to the outside of the external device 101. In order to block a user from the influence of the electromagnetic waves, the electronic device 101 sets radiation power on the basis of specific absorption rate (SAR) (such as the amount of electromagnetic waves absorbed into the body) according to a mobile phone radio waves rating system. For example, if a SAR value according to the mobile phone radio waves rating system is 1.6 W/Kg, the electronic device 101 sets a default radiation power not to allow the SAR value to exceed 1.6 W/Kg. When a user approaches within a specified reference distance (such as 15 mm), the electronic device 101 operates (such as power back off) the antenna 162 by a specified radiation power value (such as a radiation power value for generating SAR 0.2 W/Kg) lower than a default radiation power value for generating the SAR value of 1.6 W/Kg, thereby protecting a user from electromagnetic waves.

According to various embodiments of the present disclosure, the network 165 may be telecommunications network. The telecommunications network may include at least one of a computer network, an internet, an internet of things, and a telephone network. According to an embodiment of the present disclosure, a protocol (such as a transport layer protocol, a data link layer protocol, or a physical layer protocol) for a communication between the electronic device 101 and an external device is supported by at least one of the application 134, the application programming interface 133, the middleware 132, the kernel 131, and the communication interface 160.

The sensor unit 170 detects the electronic device 101 itself or surroundings of the electronic device 101. According to various embodiments of the present disclosure, the sensor unit 170 generates information for determining a state of the electronic device 101 itself that includes a gesture sensor, a gyro sensor, and an acceleration sensor. Additionally, as including a proximity sensor, a UV sensor, and a biometric sensor, the sensor unit 170 generates information for determining whether a surrounding object (such as a user or an object) approaches or an approaching degree. Information detected through the sensor unit 170 is used for setting a radiation power value. Information about a configuration of the sensor unit 170 is provided through FIG. 2.

Figure 2:
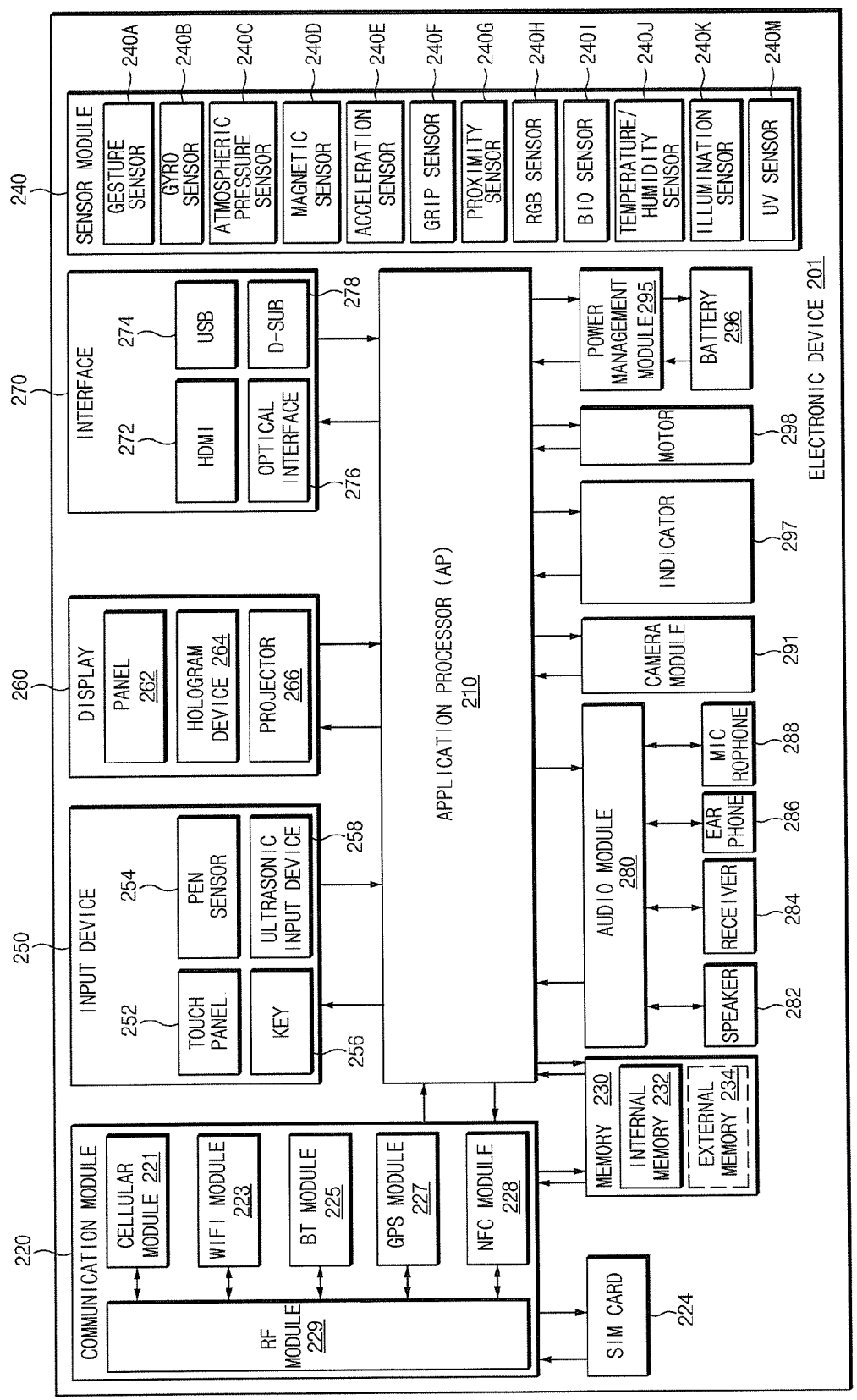
FIG. 2 illustrates an example block diagram of an electronic device according to various embodiments of the present disclosure.

FIG. 2 illustrates an example block diagram of an electronic device 201 according to various embodiments of the present disclosure. The electronic device 201 configures all or part of the aforementioned electronic device 101 shown in FIG. 1.

As illustrated in FIG. 2, the electronic device 201 includes application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software components connected to the AP 210 and also performs various data processing and operations with multimedia data by executing an operating system or an application program. The AP 210 is implemented with a system on chip (SoC). According to an embodiment of the present disclosure, the AP 210 further includes a graphic processing unit (GPU) (not shown in the present disclosure).

The communication module 220 (such as the communication interface 160) performs data transmission/reception through a communication path between other electronic devices (such as the electronic device 102) connected to the electronic device 201 (such as the electronic device 101) through a network. According to an embodiment of the present disclosure, the communication module 220 includes a cellular module 221, a WiFi module 223, a BT module 225, a GPS module 227, a near far communication (NFC) module 228, and a radio frequency (RF) module 229.

The cellular module 221 provides voice calls, video calls, text services, or internet services through a communication network (such as LTE, LTE-A, CDMA, WCDMA, UMTS, WiBro, or GSM). Additionally, the cellular module 221 performs a distinction and authentication operation on an electronic device in a communication network by using a subscriber identification module (such as the SIM card 224). According to an embodiment of the present disclosure, the cellular module 221 performs at least part of a function that the AP 210 provides. For example, the cellular module 221 performs at least part of a multimedia control function.

According to an embodiment of the present disclosure, the cellular module 221 further includes a communication processor (CP). Additionally, the cellular module 221 is implemented with SoC. As illustrated in FIG. 2, components such as the cellular module 221 (such as a CP), the memory 230, or the power management module 295 are separated from the AP 210, but according to an embodiment of the present disclosure, the AP 210 is implemented including some of the above-mentioned components (such as the cellular module 221).

According to an embodiment of the present disclosure, the AP 210 or the cellular module 221 (such as a CP) loads instructions or data, which are received from a nonvolatile memory or at least one of other components connected thereto, into a volatile memory and then processes them. Furthermore, the AP 210 or the cellular module 221 stores data received from or generated by at least one of other components in a nonvolatile memory.

Each of the WiFi module 223, the BT module 225, the GPS module 227, and the NFC module 228 include a processor for processing data transmitted/received through a corresponding module. Although the cellular module 221, the WiFi module 223, the BT module 225, the GPS module 227, and the NFC module 228 are shown as separate blocks in FIG. 2, according to an embodiment of the present disclosure, some (such as at least two) of the cellular module 221, the WiFi module 223, the BT module 225, the GPS module 227, and the NFC module 228 are included in one integrated chip (IC) or an IC package. For example, at least some (such as a CP corresponding to the cellular module 221 and a WiFi processor corresponding to the WiFi module 223) of processors respectively corresponding to the cellular module 221, the WiFi module 223, the BT module 225, the GPS module 227, and the NFC module 228 are implemented with one SoC.

The RF module 229 is responsible for data transmission, for example, the transmission of an RF signal. Although not shown in the drawings, the RF module 229 includes a transceiver, a power amp module (PAM), a frequency filter, or a low noise amplifier (LNA). Additionally, the RF module 229 further includes components for transmitting/receiving electromagnetic waves on a free space in a wireless communication, for example, conductors or conducting wires. Although the cellular module 221, the WiFi module 223, the BT module 225, the GPS module 227, and the NFC module 228 share one RF module 229 shown in FIG. 2, according to an embodiment of the present disclosure, at least one of the cellular module 221, the WiFi module 223, the BT module 225, the GPS module 227, and the NFC module 228 perform the transmission of an RF signal through an additional RF module.

The SIM card 224 is a card including a subscriber identification module and inserted into a slot formed at a specific position of an electronic device. The SIM card 224 includes unique identification information (such as an integrated circuit card identifier (ICCID)) or subscriber information (such as an international mobile subscriber identity (IMSI)).

The memory 230 (such as the memory 130) includes an internal memory 232 or an external memory 234. The internal memory 232 includes at least one of a volatile memory (such as dynamic RAM (DRAM), static RAM (SRAM), synchronous dynamic RAM (SDRAM)) and a non-volatile memory (such as, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 232 is a solid state drive (SSD). The external memory 234 further includes flash drive, for example, a compact flash (CF), a secure digital (SD), a micro Micro-SD, a Mini-SD, an extreme digital (xD), or a memory stick. The external memory 234 is functionally connected to the electronic device 201 through various interfaces. According to an embodiment of the present disclosure, the electronic device 201 further includes a storage device (such as a storage medium) such as a hard drive.

The sensor module 240 (such as the sensor unit 170) measures physical quantities or detects an operating state of the electronic device 201, thereby converting the measured or detected information into electrical signals. The sensor module 240 includes at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (such as a red, green, blue (RGB) sensor), a biometric sensor 240I, a temperature/humidity sensor 240J, an illumination sensor 240K, and an ultra violet (UV) sensor 240M. Additionally or alternatively, the sensor module 240 includes an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 240 further includes a control circuit for controlling at least one sensor therein.

According to various embodiments of the present disclosure, the proximity sensor 240G includes a capacitor where capacitance is changed according to a distance to a user. The proximity sensor 240G detects a change in the capacitance (such as increase or decrease) or a change degree. For example, the proximity sensor 240G detects whether the capacitance of a capacitor is increased and an increasing degree when a user approaches the electronic device 101. Additionally, the proximity sensor 240G detects whether the capacitance of a capacitor is decreased and a decreasing degree when a user leaves the electronic device 101. Information on a change in capacitance recognized through the proximity sensor 240G is used for setting the radiation power of the antenna 162. Hereinafter, although it is described mainly that the sensor unit 170 includes the proximity sensor 240G, the present disclosure is not limited thereto.

The input device 250 includes a touch panel 252, a (digital) pen sensor 254, a key 256, or an ultrasonic input device 258. The touch panel 252 recognizes a touch input through at least one of capacitive, resistive, infrared, or ultrasonic methods, for example. Additionally, the touch panel 252 further includes a control circuit.

The display 260 (such as the display 150) includes a panel 262, a hologram device 264, or a projector 266. The panel 262 includes a liquid-crystal display (LCD) or an active-matrix organic light-emitting diode (AM-OLED). The panel 262 is implemented to be flexible, transparent, or wearable, for example.

The interface 270 includes a high-definition multimedia interface (HDMI) 272, a universal serial bus (USB) 274, an optical interface 276, or a D-subminiature (sub) 278 for example. The interface 270, for example, is included in the communication interface 160 shown in FIG. 1. Additionally or alternatively, the interface 270 includes a mobile high-definition link (MHL) interface, a secure Digital (SD) card/multi-media card (MMC) interface, or an infrared data association (IrDA) standard interface.

The audio module 280 converts sound into electrical signals and convert electrical signals into sounds. At least some components of the audio module 280, for example, are included in the input/output interface 140 shown in FIG. 1. The audio module 280 processes sound information inputted/outputted through a speaker 282, a receiver 284, an earphone 286, or a microphone 288.

The camera module 291, as a device for capturing a still image and a video, includes at least one image sensor (such as a front sensor or a rear sensor), a lens (not shown), an image signal processor (ISP) (not shown), or a flash (not shown) (such as an LED or a xenon lamp).

The power management module 295 manages the power of the electronic device 201. Although not shown in the drawings, the power management module 295 includes a power management IC (PMIC), a charger IC, or a battery or fuel gauge.

The PMIC is built in an IC or SoC semiconductor. A charging method is classified into a wired method and a wireless method. The battery gauge measures the remaining amount of the battery 296, or a voltage, current, or temperature thereof during charging. The battery 296 stores or generates electricity and supplies power to the electronic device 201 by using the stored or generated electricity. The battery 296, for example, includes a rechargeable battery or a solar battery.

The indicator 297 displays a specific state of the electronic device 201 or part thereof (such as the AP 210), for example, a booting state, a message state, or a charging state.

The motor 298 converts electrical signals into mechanical vibration. Although not shown in the drawings, the electronic device 201 includes a processing device (such as a GPU) for mobile TV support. A processing device for mobile TV support processes media data according to the standards such as digital multimedia broadcasting (DMB), digital video broadcasting (DVB), or media flow.

Figure 3:
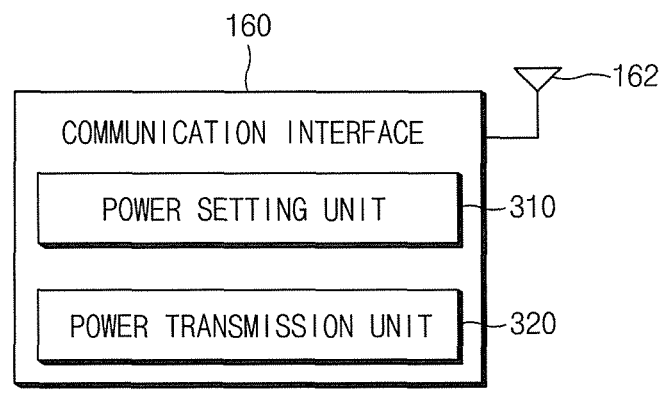
FIG. 3 illustrates an example block diagram of a communication interface according to various embodiments of the present disclosure.

FIG. 3 illustrates an example block diagram of a communication interface 300 according to various embodiments of the present disclosure.

As illustrated in FIG. 3, the communication interface 160 includes a power setting unit 310 and a power providing unit 320. However, the division is a classification according to a function and is not limited thereto. For example, the power setting unit 310 and the power providing unit 320 are implemented in one module form. For another example, the power setting unit 310 is implemented in a form of being included as part of the processor 120 shown in FIG. 1.

The power setting unit 310 sets a radiation power value on the basis of information collected by the sensing unit 170 (such as the proximity sensor 240G). The power setting unit 310 compares detection information collected by the sensor unit 170 (such as a change in capacitance of a capacitor included in the proximity sensor 240G) with a plurality of threshold values (such as an entry threshold value or a withdrawal threshold value) and sets a radiation power value according to a comparison result.

For example, when a user approaches the electronic device 101 gradually and thus the capacitance of a capacitor in the proximity sensor 240G is increased, the power setting unit 310 compares the capacitance with an entry threshold value. The entry threshold value, as a value determined based on operating characteristics of the proximity sensor 240G, is preset and stored in a manufacturing step or a service step of the electronic device 101. When a capacitance exceeds an entry threshold value, the power setting unit 310 sets a radiation power value to a specified radiation power value (such as a radiation power value having a SAR of 0.2 W/Kg) lower than a default setting value (such as a radiation power value having a SAR of 1.6 W/Kg).

When a user leaves the electronic device 101 gradually and thus the capacitance of a capacitor in the proximity sensor 240G is decreased, the power setting unit 310 compares the capacitance with a withdrawal threshold value. Like the entry threshold value, the withdrawal threshold value, as a value determined based on operating characteristics of the proximity sensor 240G, is preset and stored in a manufacturing step or a service step of the electronic device 101. According to various embodiments of the present disclosure, in relation to the proximity sensor 240G, a change of capacitance when a user approaches is not be identical to that when a user leaves and the withdrawal threshold value is different than the entry threshold value.

When a capacitance is less than a withdrawal threshold value, the power setting unit 310 sets a radiation power value to a default setting value (such as a radiation power value having a SAR of 1.6 W/Kg). When a user is located adjacent to the electronic device 101, the electronic device 101 lowers radiation power in order to protect a user. In certain embodiments, when a user is away more than a specified distance from the electronic device 101, the electronic device 101 improves communication quality by raising radiation power. The electronic device 101 controls radiation power by using a plurality of threshold values (such as an entry threshold value and a withdrawal threshold value). Information on a method of setting radiation power by using a plurality of threshold values is provided through FIGS. 4 to 7.

The power providing unit 320 provides power according to a radiation power value set by the power setting unit 310 to the antenna 162. As power provided from the power providing unit 320 is higher, the communication quality of the antenna 162 is improved (such as data transmission/reception speed increase).

According to various embodiments of the present disclosure, the antenna 162 is implemented in a form of being included in the communication interface 160. The antenna 162 is driven according to the provided radiation power and transmits/receives data to/from an external electronic device (such as the electronic device 102 or the server 103).

According to various embodiments, an electronic device includes: a sensing unit configured to generate information by detecting a user; a power setting unit configured to set a radiation power value by comparing the information with a plurality of threshold values; a power providing unit configured to provide power according to the set radiation power value; and an antenna configured to perform communication by the provided power.

According to various embodiments of the present disclosure, the plurality of threshold values includes an entry threshold value according to a user's approach and a withdrawal threshold value according to a user's withdrawal. The entry threshold value is different than the withdrawal threshold value and a reference distance to a user determined by the entry threshold value is identical to a reference distance to a user determined by the withdrawal threshold value.

According to various embodiments of the present disclosure, the sensor unit includes a proximity sensor and the information comprises information on a capacitance change of a capacitor included in the proximity sensor. When a capacitance of the capacitor exceeds the entry threshold value as a user approaches the electronic device, the power setting unit lowers radiation power to a specified setting value. When a capacitance of the capacitor is less than a withdrawal threshold value as a user is away from the electronic device, the power setting unit raises radiation power to a default setting value. A capacitance value or a change width of the capacitor varies when a user approaches the capacitor and when a user is away from the sensor unit.

According to various embodiments of the present disclosure, the electronic device further includes a memory for storing the plurality of threshold values and a reference device between a user and the electronic device determined by the plurality of threshold values.

Figure 4:
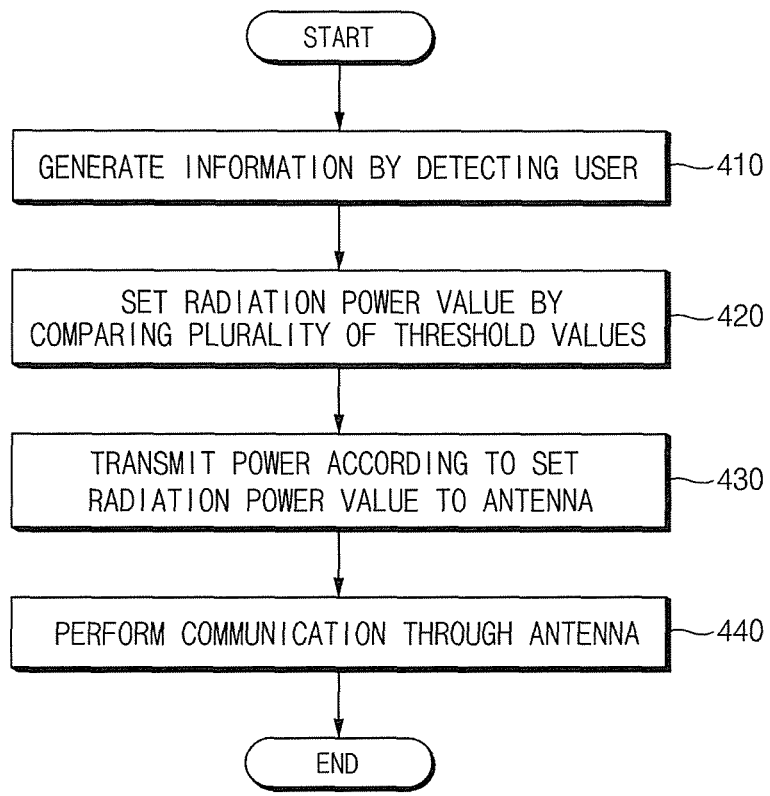
FIG. 4 illustrates an example flowchart of a radiation power control method according to various embodiments of the present disclosure.

FIG. 4 illustrates an example flowchart of a radiation power control method according to various embodiments of the present disclosure.

As illustrated in FIG. 4, the sensor unit 70 collects detection information by detecting a user's motion in operation 410. For example, the sensor unit 170 detects whether a user approaches or leaves the electronic device 101 through the proximity sensor 240G. The sensor unit 170 provides detection information to the power setting unit 310. According to various embodiments of the present disclosure, the proximity sensor 240G includes a capacitor where capacitance is changed according to a movement of a surrounding object (such as a user). When a surrounding object approaches, the capacitance of the capacitor is increased and when the surrounding object is away progressively, the capacitance of the capacitor is decreased.

In operation 420, the power setting unit 310 compares the detection information with a plurality of threshold values and according to a comparison result, sets a radiation power value. According to various embodiments of the present disclosure, the power setting unit 310 receives information on a capacitance change in a capacitor included in the proximity sensor 240G. The power setting unit 310 adjusts a radiation power value as comparing a plurality of threshold values (such as an entry threshold value or a withdrawal threshold value) with the current capacitance of a capacitor.

For example, when a user approaches the electronic device 101 gradually, the capacitance of a capacitor included in the electronic device 101 is increased gradually. In this case, after comparing a preset entry threshold value with the capacitance of a capacitor, if the capacitor exceeds the entry threshold value, the power setting unit 310 protects a user by lowering a radiation power value. For another example, when a user is away from the electronic device 101 gradually, the capacitance of a capacitor included in the electronic device 101 is decreased gradually. In this case, after comparing a preset withdrawal threshold value with the capacitance of a capacitor, if the capacitor is less than the withdrawal threshold value, the power setting unit 310 improves communication quality by raising a radiation power value.

In operation 430, the power providing unit 320 provides power according to the radiation power value to the antenna 162. As power provided from the power providing unit 320 is higher, the communication quality of the antenna 162 is improved (such as data transmission/reception speed increase).

In operation 440, the antenna 162 performs a communication with an external electronic device (such as the electronic device 102 or the server 103) according to the provided power.

Figure 5:
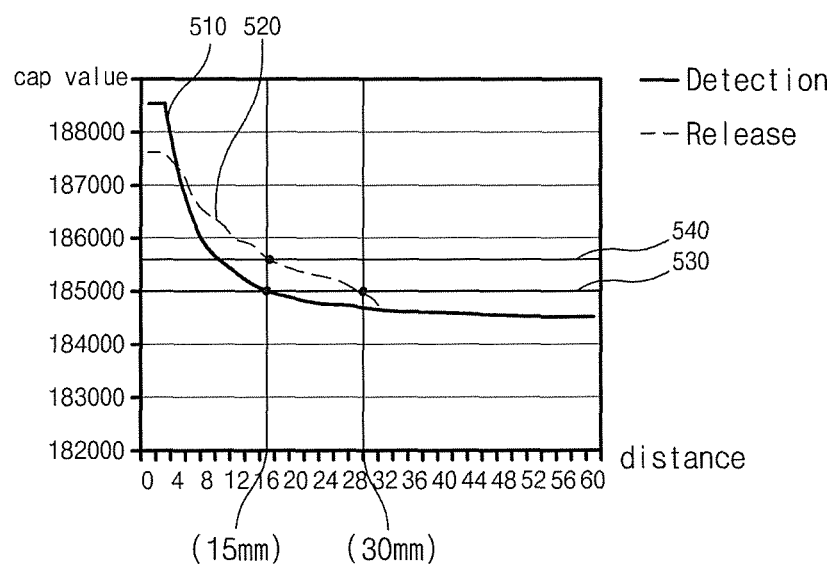
FIG. 5 illustrates an example graph of a capacitance of a capacitor in a proximity sensor according to various embodiments of the present disclosure.

FIG. 5 illustrates an example a graph of a capacitance change of a capacitor in a proximity sensor according to various embodiments of the present disclosure.

As illustrated in FIG. 5, the proximity sensor 240G includes a capacitor where capacitance is changed according to a movement of a surrounding object (such as, a user). The capacitance of the capacitor varies according to a distance between the electronic device 101 and a surrounding object (such as a user). The capacitance is increased as a distance between the electronic device 101 and an object is shorter and is decreased as the distance is longer. According to various embodiments of the present disclosure, a change in capacitance (hereinafter, an approaching capacitance 510) when an object approaches the electronic device 101 is different than a change in capacitance (hereinafter, a withdrawal capacitance 520) when an object is away from the electronic device 101. For example, the approaching capacitance 510 has a smaller value than the withdrawal capacitance 520 within a predetermined section (such as 15 mm to 30 mm). Additionally, within a section (such as within 15 mm) adjacent to the electronic device 101, a change of the approaching capacitance 510 is more drastic than a change of the withdrawal capacitance 520.

According to various embodiments of the present disclosure, the power setting unit 310 compares a plurality of threshold values (such as an entry threshold value 530 and a withdrawal threshold value 540) with the current capacitance and sets a radiation power value according to a comparison result. The entry threshold value 530 and the withdrawal threshold value 540, as a value determined based on operating characteristics of the proximity sensor 240G, is preset and stored in a manufacturing step or a service step of the electronic device 101. Although it is shown in FIG. 5 that a comparison is performed based on two threshold values (such as the entry threshold value 530 and the withdrawal threshold value 540), the present disclosure is not limited thereto. For example, the power setting unit 310 sets radiation power by using three or more threshold values.

When a user approaches the electronic device 101 gradually and thus the approaching capacitance 510 is increased, the power setting unit 310 compares the approaching capacitance 510 with the entry threshold value 530. When the approaching capacitance 510 exceeds the entry threshold value 530, the power setting unit 310 sets a radiation power value to a specified radiation power value (such as a radiation power value having a SAR of 0.2 W/Kg) lower than a default setting value (such as a radiation power value having a SAR of 1.6 W/Kg).

In certain embodiments, when a user is away from the electronic device 101 gradually and thus the withdrawal capacitance 520 is decreased, the power setting unit 310 compares the withdrawal capacitance 520 with the withdrawal threshold value 540. When the withdrawal capacitance 520 is less than the withdrawal threshold value 540, the power setting unit 310 sets a radiation power value to a default setting value (such as a radiation power value having a SAR of 1.6 W/Kg).

According to various embodiments of the present disclosure, when a user approaches the electronic device 101, a distance (such as 15 mm) (hereinafter referred to as an approaching reference distance) that is a reference of a radiation power change is identical to a reference distance (hereinafter referred to as a withdrawal reference distance) when a user is away from the electronic device 101. The approaching reference distance is a distance between a user and the electronic device 101 when the approaching capacitance 510 becomes the entry threshold value 530 and the withdrawal reference distance is a distance between a user and the electronic device 101 when the withdrawal capacitance 520 is identical to the withdrawal threshold value 540. In consideration of the operating characteristics of the proximity sensor 240G according to whether a user approaches or leaves, manufacturers or service providers adjusts the entry threshold value 530 and the withdrawal threshold value 540 in order to change a radiation power value within the same reference distance (such as 15 mm) according to whether a user approaches or leaves.

When a distance to a user is detected by one threshold value, since a capacitance changes according to whether a user approaches and leaves varies, radiation power varies in different reference distances according to a user approaches or leaves. For example, when a user approaches, radiation power is lowered on the basis of a reference distance of 15 mm. In certain embodiments, when a user leaves, radiation power is raised on the basis of a reference distance of 30 mm. Even at a distance that is regardless of sufficiently improving communication quality when a distance between a user and a device is out of 15 mm, radiation power is set to a lower value still, so that communication efficiency is deteriorated.

In certain embodiments, the electronic device 101 sets radiation power by using a plurality of threshold values (such as the entry threshold value 530 and the withdrawal threshold value 540). When a user is out of a reference distance (such as 15 mm) from the electronic device 101, the electronic device 101 improves communication quality by raising radiation power immediately.

Figure 6:
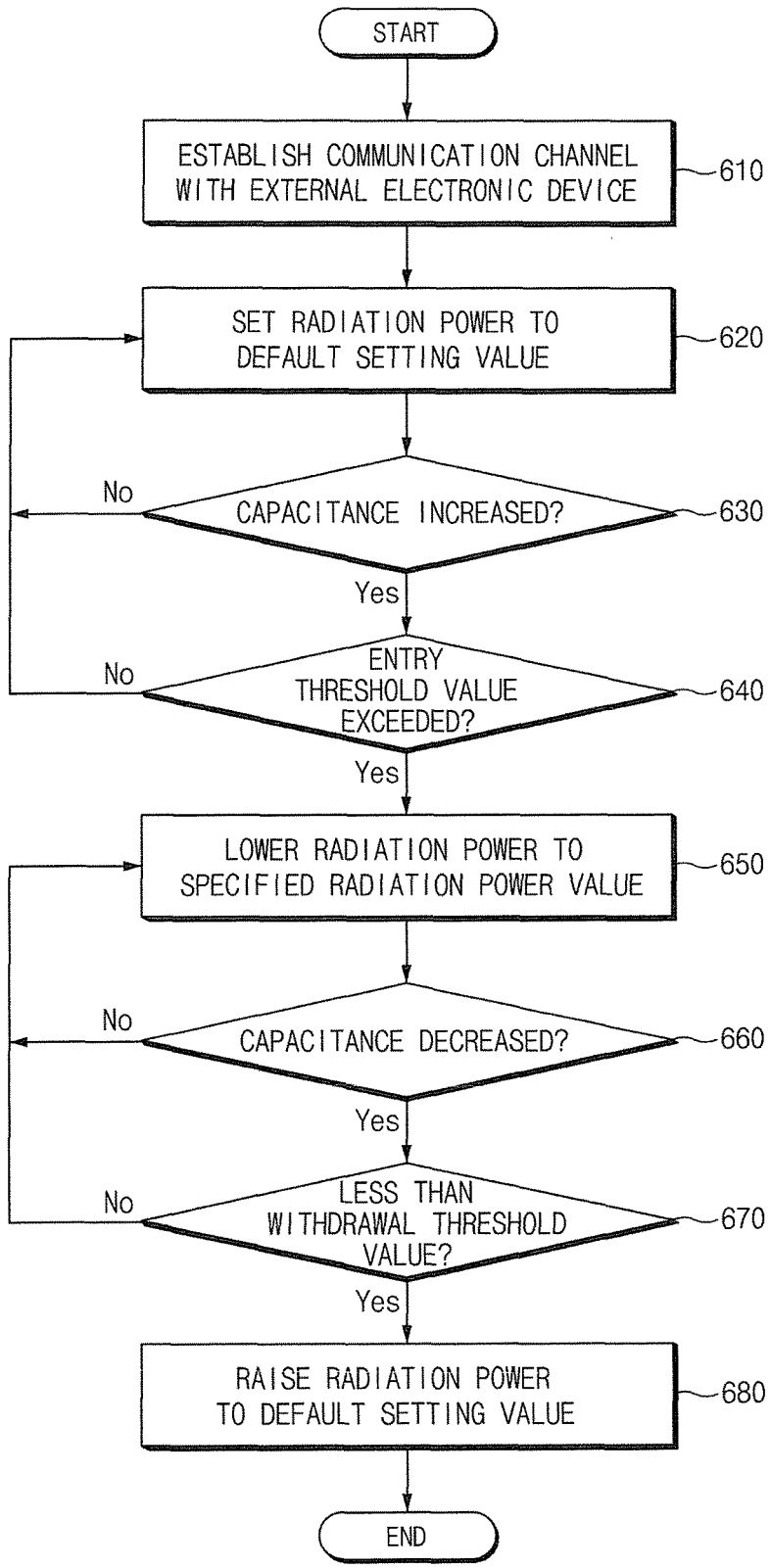
FIG. 6 illustrates an example flowchart of a radiation power control method depending on a movement of a user according to various embodiments of the present disclosure.

FIG. 6 illustrates an example flowchart of a radiation power control method 600 depending on a user's movement according to various embodiments of the present disclosure.

As illustrated in FIG. 6, at step operation 610, the communication interface 160 establishes a communication channel with an external electronic device (such as the electronic device 102 or the server 103) through the antenna 162. The electronic device 101 transmits/receives data to/from an external electronic device through the communication channel. The communication quality (such as data transmission/reception speed) of the communication channel varies according to radiation power provided to the antenna 162. For example, as the radiation power is higher, a data transmission/reception speed through the communication channel is higher.

At step 620, the power setting unit 310 sets radiation power with a default setting value. For example, the default setting value corresponds to a power value for generating a SAR of less than 1.6 W/Kg.

At step 630, the power setting unit 310 checks whether the capacitance of a capacitor included in the proximity sensor 240G is increased. When the capacitance of a capacitor is a constant or decreased, the power setting unit 310 maintains the current default setting value. When the capacitance of a capacitor is increased gradually, the power setting unit 310 adjusts a radiation power value according to step 640 and step 650.

At step 640, the power setting unit 310 checks whether the capacitance of a capacitor exceeds the entry threshold value 530. When the capacitance of a capacitor does not exceed the entry threshold value 530, the power setting unit 310 maintains the current default setting value.

At step 650, when a user approaches within a reference distance (such as 15 mm) from the electronic device 101, if the capacitance of a capacitor exceeds the entry threshold value 530, the power setting unit 310 sets radiation power to a specified radiation power value (such as a SAR of 0.2 W/Kg). The power setting unit 310 protects a user from electromagnetic waves by lowering a radiation power value as a user approaches.

At step 660, the power setting unit 310 checks whether the capacitance of a capacitor included in the proximity sensor 240G is decreased. When the capacitance of a capacitor is constant or increased, the power setting unit 310 maintains the current specified radiation power value (such as a SAR value of 0.2 W/Kg). When the capacitance of a capacitor is decreased gradually, the power setting unit 310 adjusts radiation power.

At step 670, the power setting unit 310 checks whether the capacitance of a capacitor is less than the withdrawal threshold value 540 or less than the withdrawal value 540. When the capacitance of a capacitor is equal to or greater than the withdrawal value 540, the power setting unit 310 maintains the current specified radiation power value (such as a SAR value of 0.2 W/Kg).

At step 680, when a user is out of a reference distance (such as 15 mm) from the electronic device 101 so that the capacitance of a capacitor is less than the withdrawal threshold value 540, the power setting unit 310 sets radiation power to a default setting value (such as a SAR of 1.6 W/Kg). The power setting unit 310 improves communication quality by raising a radiation power value to a value before a user accesses.

According to various embodiments of the present disclosure, the power setting unit 310 divides a distance to a user into a plurality of distance sections by using a plurality of threshold values and sets a specified radiation power value in each distance section. For example, the power setting unit 310 divides a distance section on the basis of intersection points where first to third threshold values and a capacitance change graph meet, and sets a radiation power value necessary for each section by setting different capacitance values in each distance section.

Figure 7:
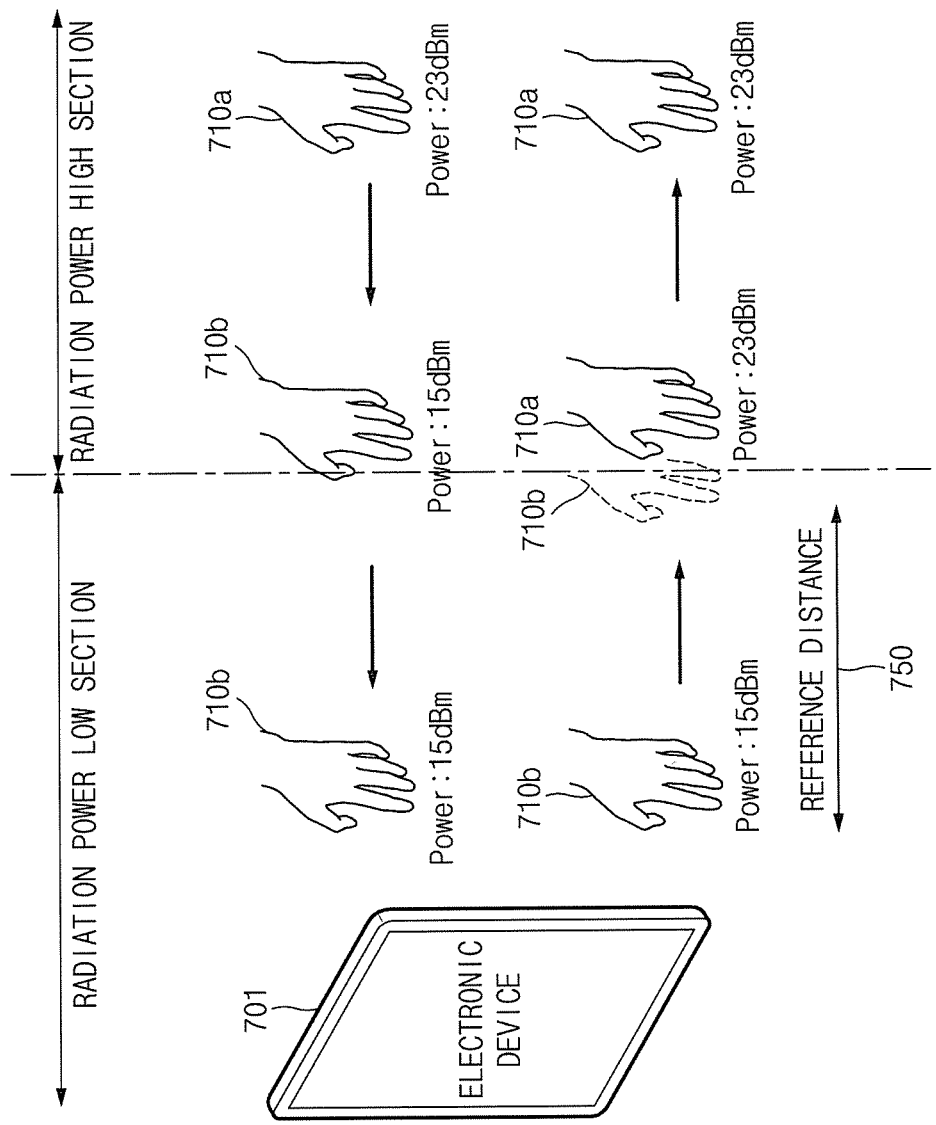
FIG. 7 illustrates an example radiation power change depending on a movement of an object around an electronic device according to various embodiments of the present disclosure.

FIG. 7 illustrates an example a radiation power change 700 depending on a movement of an object around an electronic device according to various embodiments of the present disclosure.

As illustrated in FIG. 7, when a surrounding object (such as a user or a thing) is out of a reference distance 750 (such as 15 mm) in a state of 710a, the electronic device 701 outputs radiation power with a default setting value (such as 23 dBm). The default setting value is a power value for generating a SAR of less than 1.6 W/Kg, which satisfies a reference according to a mobile phone radio waves rating system.

When a user approaches the electronic device 701 and enters within the reference distance 750 (such as 15 mm), for example, when the capacitance of a capacitor exceeds the entry threshold value 530, (such as a change from the state of 710a to a state of 710b), the electronic device 701 sets radiation power to a specified radiation power (such as 15 dBm) in order to protect a user from electromagnetic waves.

When a user leaves the electronic device 701 and is out of the reference distance 750 (such as 15 mm), for example, when the capacitance of a capacitor is less than the withdrawal threshold value 540, (such as a change from the state of 710b to the state of 710a), the electronic device 701 improves communication quality by setting radiation power to a default setting value (such as 23 dBm).

When a capacitance is compared with one threshold value, radiation power is adjusted. In this case, even when a user is out of the reference value 750 (such as 15 mm), radiation power is set to be low continuously so that communication efficiency is deteriorated. In certain embodiments, when a user enters within the reference distance 750 (such as 15 mm), the electronic device 701 lowers the radiation power immediately, and when the user is out of the reference distance 750, raises the radiation power immediately in order to improve communication efficiency.

According to various embodiments, a radiation power control method includes: generating information by detecting a user through sensor unit; setting a radiation power value by comparing the information with a plurality of threshold values; providing power according to the set radiation power value; and performing communication by the provided power. The plurality of threshold values includes an entry threshold value according to a user's approach and a withdrawal threshold value according to a user's withdrawal. The entry threshold value is different than the withdrawal threshold value and a reference distance to a user determined by the entry threshold value is identical to a reference distance to a user determined by the withdrawal threshold value.

According to various embodiments of the present disclosure, the setting of the radiation power value includes when a capacitance of the capacitor included in the sensor unit exceeds the entry threshold value as a user approaches the electronic device, lowering radiation power to a specified setting value. The lowering of the radiation power to the specified setting value includes notifying a user that radiation power is changed to the specified setting value. The setting of the radiation power value includes when a capacitance of the capacitor is less than a withdrawal threshold value as a user is away from the electronic device, raising radiation power to a default setting value.

Aforementioned various embodiments of the present disclosure adjust radiation power according to a spaced distance between a user and an electronic device by using a plurality of threshold values.

When a user enters within a predetermined reference distance on the basis of an electronic device, various embodiments protect a user from electromagnetic waves by lowering radiation power and improve communication efficiency by raising radiation power immediately when a user is out of the reference distance.

Each of the aforementioned components of the electronic device according to various embodiments of the present disclosure are configured with at least one component and the name of a corresponding component varies according to the kind of an electronic device. According to various embodiments of the present disclosure, an electronic device according to various embodiments of the present disclosure includes at least one of the aforementioned components, does not include some of the aforementioned components, or further includes another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (such as modules or functions thereof) or a method (such as operations) according to this disclosure, for example, as in a form of a programming module, may be implemented using an instruction stored in computer-readable storage media. When at least one processor (such as the processor 120) executes an instruction, it may perform a function corresponding to the instruction. The non-transitory computer-readable storage media may include the memory 130, for example. At least part of a programming module may be implemented (such as example, executed) by the processor 120, for example. At least part of a programming module may include a module, a program, a routine, sets of instructions, or a process to perform at least one function, for example.

The computer-readable storage media may include Magnetic Media such as a hard disk, a floppy disk, and a magnetic tape, optical media such as compact disc read only memory (CD-ROM) and digital versatile disc (DVD), magneto-optical media such as floptical disk, and a hardware device especially configured to store and perform a program instruction (such as a programming module) such as read only memory (ROM), random access memory (RAM), and flash memory. Additionally, a program instruction may include high-level language code executable by a computer using an interpreter in addition to machine code created by a complier. The hardware device may be configured to operate as at least one software module to perform an operation of various embodiments and vice versa.

According to various embodiments of the present disclosure, in relation to a non-transitory computer-readable storage medium having an instruction for controlling operations of an electronic device, the command is to allow the electronic device to generate information by detecting a user through a sensor unit, set a radiation power value by comparing the information with a plurality of threshold values, and perform communication by the provided power.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a sensor circuitry configured to generate information about a user's motion;
   at least one processor configured to:
      compare the information with a plurality of threshold values of capacitance of a capacitor associated with the sensor circuitry, wherein the plurality of threshold values includes an entry threshold value and a withdrawal threshold value; and
      set a radiation power value according to a comparison result; and
   an antenna configured to:
      perform a communication in accordance with power, wherein the power is determined by the radiation power value;
   wherein the entry threshold value is configured to detect a user's approaching motion in a first direction and the withdrawal threshold value is configured to detect a user's withdrawal motion in a second direction opposite to the first direction,
   wherein the entry threshold value is different than the withdrawal threshold value,
   wherein the at least one processor is further configured to:
      determine a first reference distance determined by the entry threshold value in the first direction; and
      determine a second reference distance determined by the withdrawal threshold value in the second direction,
   wherein the first reference distance is identical to the second reference distance.

2. The electronic device of claim 1, wherein the information comprises a changing of a capacitance associated with a proximity sensor included in the sensor circuitry.

3. The electronic device of claim 2, wherein a change width of the capacitance according to the user's approaching motion is different from that of the capacitance according to the user's withdrawal motion.

4. The electronic device of claim 1, wherein setting the radiation power value further comprises:

decreasing the radiation power value in accordance with a specified value when the capacitance exceeds the entry threshold value.

5. The electronic device of claim 4, wherein the capacitance of the capacitor exceeds the entry threshold value when the user's approaching motion associated with the electronic device is detected.

6. The electronic device of claim 1, wherein setting the radiation power value further comprises:
increasing the radiation power value in accordance with a default value when the capacitance is less than the withdrawal threshold value.

7. The electronic device of claim 6, wherein the capacitance of the capacitor is less than the withdrawal threshold value when the user's withdrawal motion associated with the electronic device is detected.

8. The electronic device of claim 1, further comprising a memory configured to store the plurality of threshold values and a reference distance between the user and the electronic device determined by the plurality of threshold values.

9. A method for controlling radiation power in an electronic device, the method comprising:
generating information about a user's motion through a sensor circuitry;
comparing the information with a plurality of threshold values of capacitance of a capacitor associated with the sensor circuitry, wherein the plurality of threshold values includes an entry threshold value and a withdrawal threshold value;
setting a radiation power value according to a comparison result; and
performing a communication in accordance with power, wherein the power is determined by the radiation power value,
wherein the entry threshold value is configured to detect a user's approaching motion in a first direction and the withdrawal threshold value is configured to detect a user's withdrawal motion in a second direction opposite to the first direction
wherein the entry threshold value is different than the withdrawal threshold value,
wherein the method further comprises:
determining a first reference distance determined by the entry threshold value in the first direction; and
determining a second reference distance determined by the withdrawal threshold value in the second direction,
wherein the first reference distance is identical to the second reference distance.

10. The method of claim 9, wherein setting the radiation power value further comprises:
decreasing the radiation power value in accordance with a specified value when the capacitance exceeds the entry threshold value; and
indicating the radiation power value has been changed to the specified value to the user.

11. The method of claim 10, wherein the capacitance exceeds the entry threshold value when the user's approaching motion associated with the electronic device is detected.

12. The method of claim 9, wherein setting the radiation power value further comprises:
increasing the radiation power value in accordance with a default value when the capacitance is less than the withdrawal threshold value; and
indicating the radiation power value has been changed to the default value to the user.

13. The method of claim 12, wherein the capacitance is less than the withdrawal threshold value when a user's withdrawal motion associated with the electronic device is detected.

14. The method of claim 9, wherein the information comprises a changing of the capacitance of a capacitor associated with a proximity sensor.

15. A non-transitory computer-readable storage medium having instructions to control operations of an electronic device, wherein the instructions allow the electronic device to perform:
generating information about a user's motion through a sensor circuitry;
comparing the information with a plurality of threshold values of capacitance of a capacitor associated with the sensor circuitry, wherein the plurality of threshold values includes an entry threshold value and a withdrawal threshold value;
setting the radiation power value according to a comparison result; and
performing a communication in accordance with power, wherein the power is determined by a radiation power value,
wherein the entry threshold value is configured to detect a user's approaching motion in a first direction and the withdrawal threshold value is configured to detect a user's withdrawal motion in a second direction opposite to the first direction,
wherein the entry threshold value is different than the withdrawal threshold value,
wherein the instructions further allow the electronic device to perform:
determining a first reference distance determined by the entry threshold value in the first direction; and
determining a second reference distance determined by the withdrawal threshold value in the second direction,
wherein the first reference distance is identical to the second reference distance.

* * * * *